Figure 1:
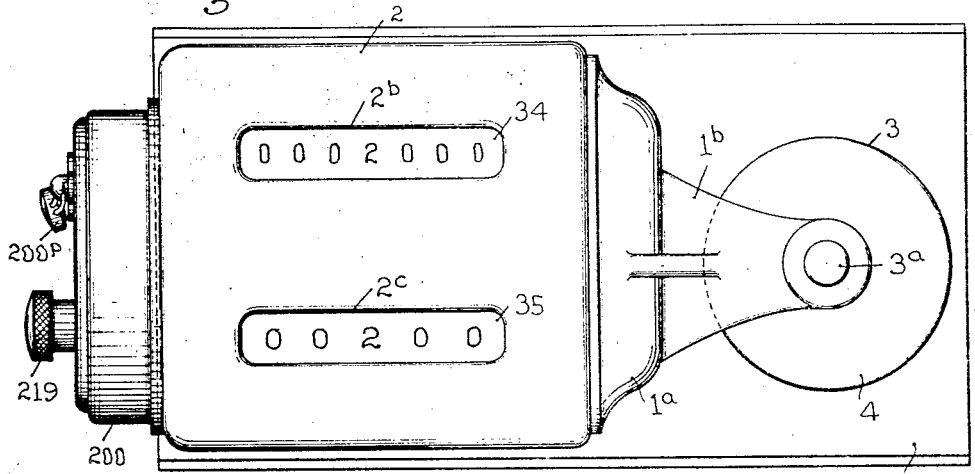

Nov. 17, 1925.

A. H. PITNEY 1,561,795

CONTROLLER FOR POSTAGE METER MACHINES AND THE LIKE

Filed Oct. 2, 1923  7 Sheets-Sheet 1

Nov. 17, 1925.　　　　　　　　　　　　　　　　　　　　1,561,795
A. H. PITNEY
CONTROLLER FOR POSTAGE METER MACHINES AND THE LIKE
Filed Oct. 2, 1923　　　　7 Sheets-Sheet 2

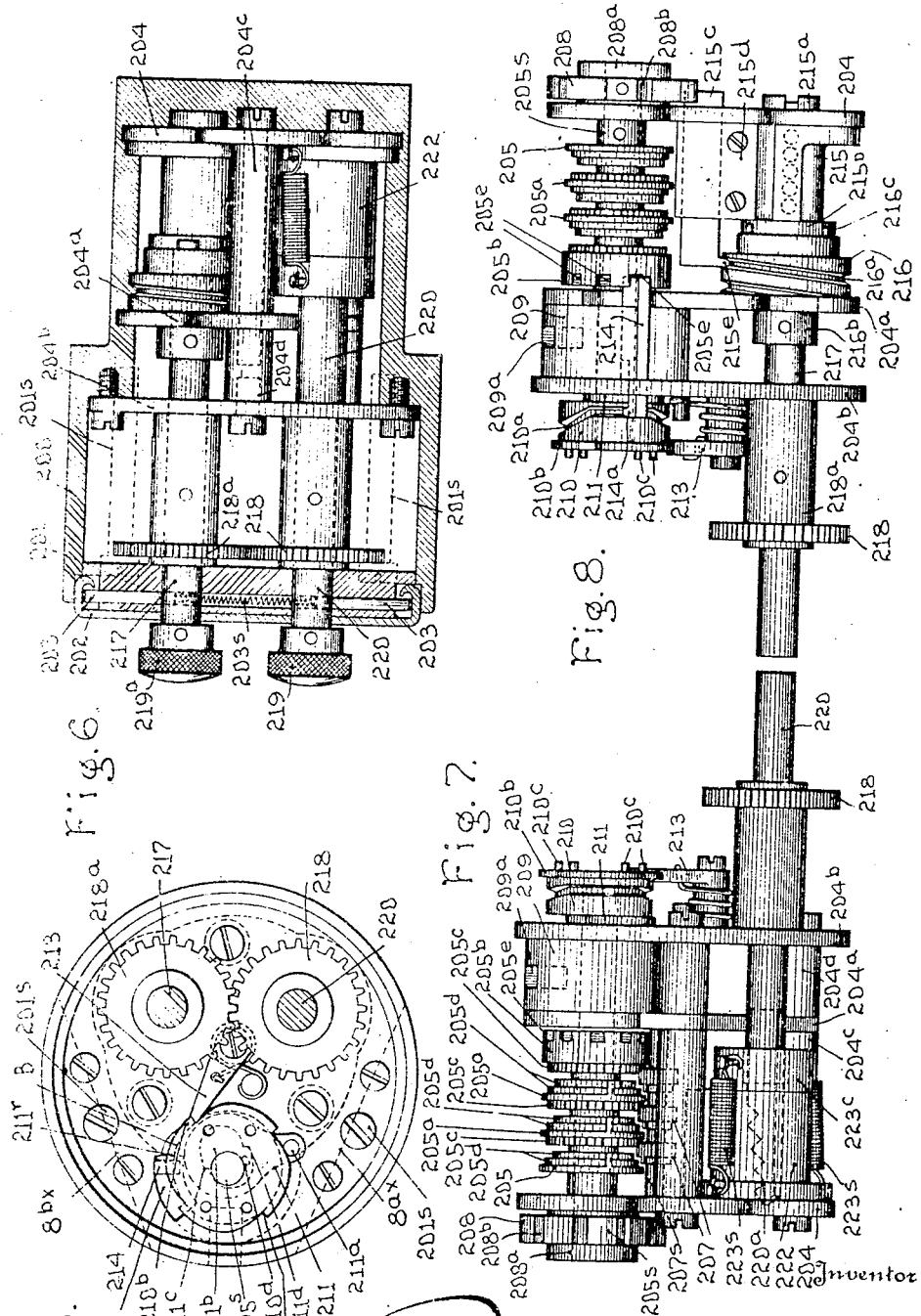

Nov. 17, 1925. 1,561,795
A. H. PITNEY
CONTROLLER FOR POSTAGE METER MACHINES AND THE LIKE
Filed Oct. 2, 1923 7 Sheets-Sheet 4

Inventor
Arthur H. Pitney
By
Attorneys.

Nov. 17, 1925.

A. H. PITNEY 1,561,795

CONTROLLER FOR POSTAGE METER MACHINES AND THE LIKE

Filed Oct. 2, 1923     7 Sheets-Sheet 5

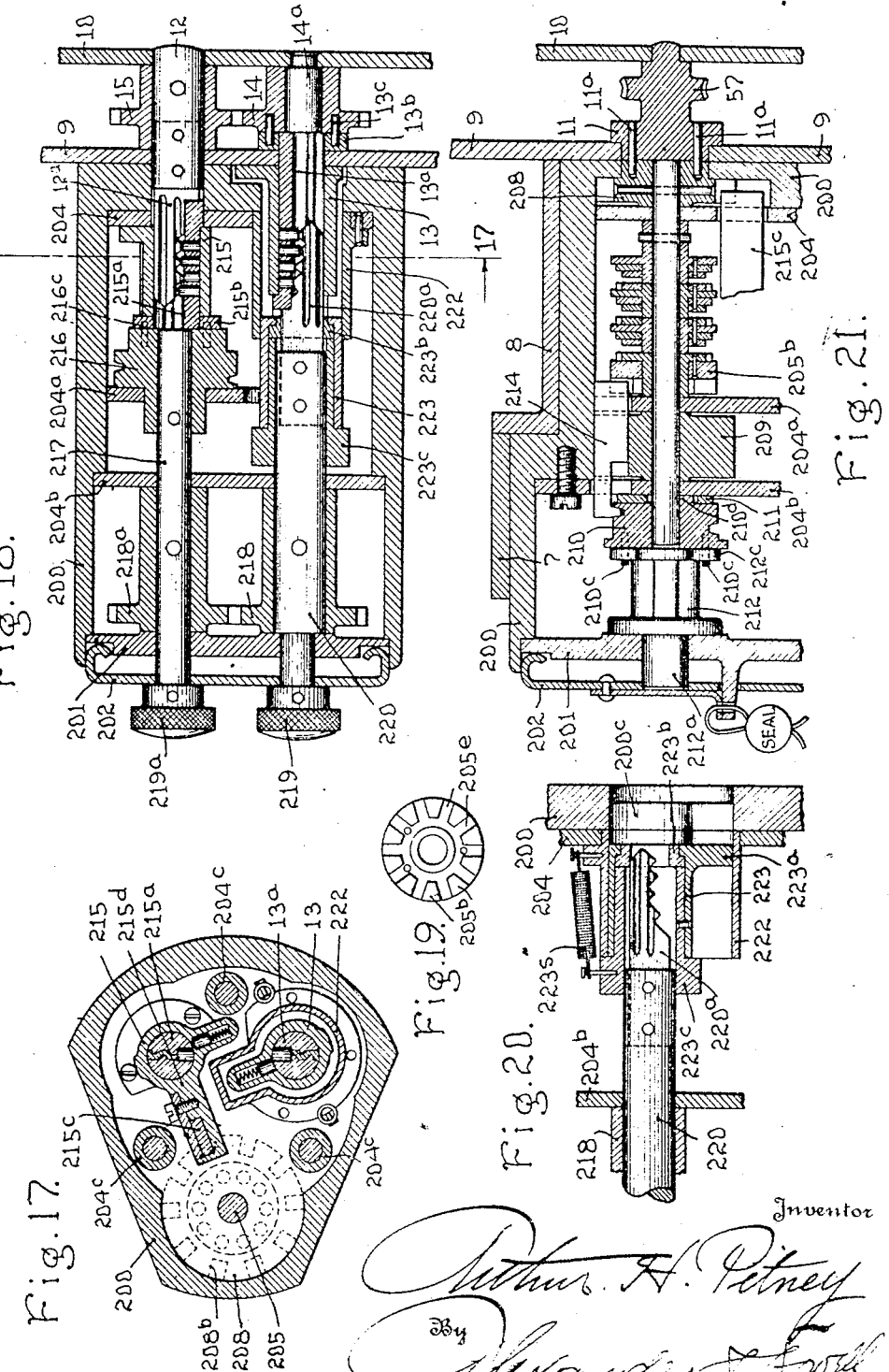

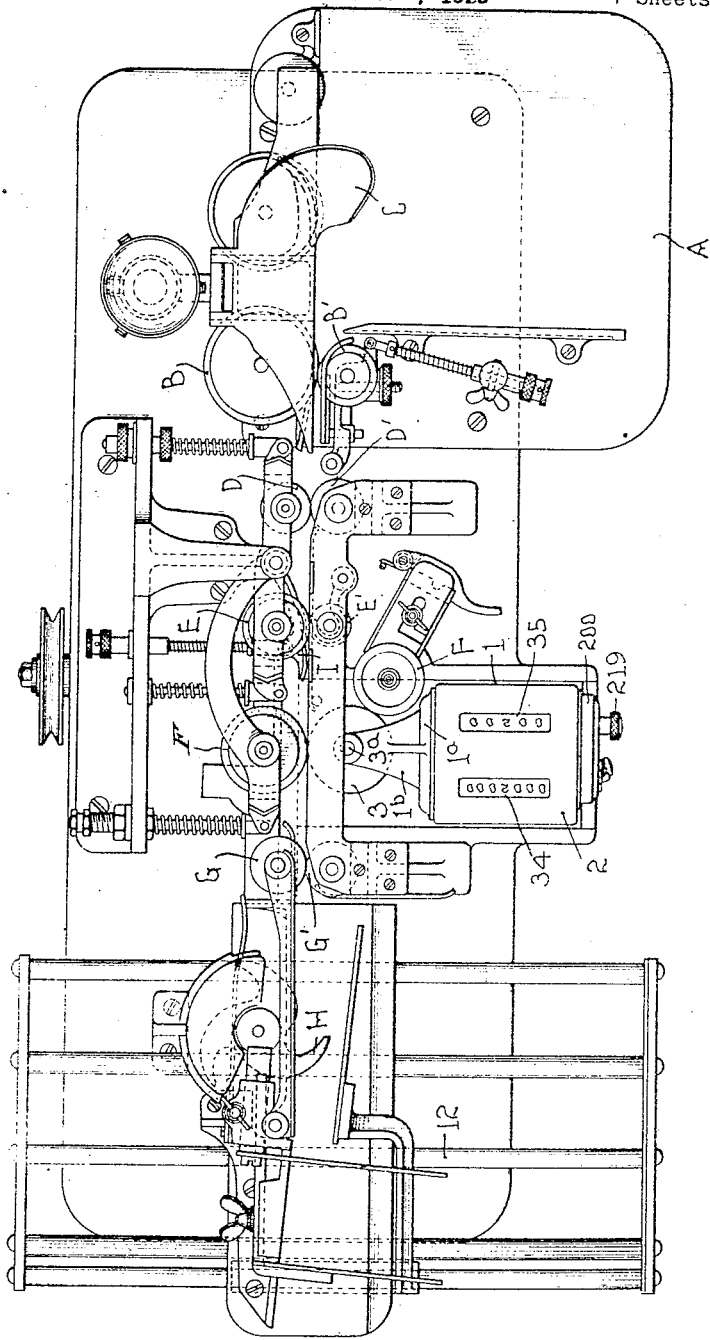

Patented Nov. 17, 1925.

1,561,795

UNITED STATES PATENT OFFICE.

ARTHUR H. PITNEY, OF STAMFORD, CONNECTICUT, ASSIGNOR, BY MESNE ASSIGNMENTS, TO PITNEY-BOWES POSTAGE METER COMPANY, OF STAMFORD, CONNECTICUT, A CORPORATION OF DELAWARE.

CONTROLLER FOR POSTAGE-METER MACHINES AND THE LIKE.

Application filed October 2, 1923. Serial No. 666,113.

*To all whom it may concern:*

Be it known that I, ARTHUR H. PITNEY, citizen of the United States, residing at Stamford, in the county of Fairfield and State of Connecticut, have invented certain new and useful Improvements in Controllers for Postage-Meter Machines and the like; and I hereby declare that the following is a full, clear, and exact description thereof, reference being had to the accompanying drawings, which form part of this specification.

This invention is a novel improvement in machines adapted to be set to perform a pre-determined number of operations and to be automatically rendered incapable of performing further operations until reset: such for example as machine for printing postage stamps on so-called "prepaid mail", for printing vouchers, tickets etc. The invention is designed for use in connection with machines for printing stamps or indicia on mail matter to do away with the necessity of applying the ordinary adhesive stamps thereto or using the ordinary stamped envelopes.

More specifically the invention is an improvement on my so-called "postage meter machines", such as disclosed in U. S. Letters Patent #1,370,668 granted to me March 8, 1921. The aforesaid patented machine is provided with a so-called removable "meter" which contains registering mechanism and automatic controlling devices whereby when a predetermined amount of postage has been printed the "meter" becomes locked, and whereby further effective operations of the printing mechanism is prevented until the meter is reset. Also in my said patent the meter is made bodily removable from the machine so that it can be taken to the post office and reset, mechanism is provided whereby no effective printing operations can be performed by the machine when the meter is removed therefrom, nor until the meter is properly reset and replaced in the machine.

The principal object of the present invention is to do away with the necessity of having the meter removable as a whole, or having the registering mechanism or printing mechanism, or parts of both removable from the machine; and instead to provide a very simple novel controller for such machine, which controller is very compact and is insertable in or removable from the meter or machine on which it is used, and when in place will permit the operations of the meter or register to reach a pre-determined number and then cause the tripping of certain mechanisms, whereby further printing operations of the machine or of the meter are prevented until the controller is removed and re-set. Means are also provided whereby when the controller is removed from the meter the latter cannot be operated nor can the machine be operated or the registering mechanism until the controller is re-set and replaced.

The principal object of the present invention is to provide what I designate a "controller" for machines of the character specified; which "controller" can be removed from and inserted in the machine; and when in place will permit effective operations of the machine until a pre-determined number of operations have been performed and when removed will release locking devices which will prevent effective operation of the meter or machine; said controller can be made very small and compact; and can be much more readily carried about than the detachable meters used on my said patented machine, and the locking and controlling devices are inaccessible, even when the controller is removed from the machine. Said controller does not contain registering mechanisms but does contain devices which can be "set" to determine and limit the number of operations which may be performed by the machine; and also contains devices which when the controller is inserted in the machine co-operate with devices in the machine to render the latter operable (while the controller is in the machine) until the number of operations for which the controller has been "set" have been performed; then the controller releases locking devices which permit further effective operations until the controller is removed, re-set and replaced.

The controller comprises locking and controlling mechanisms securely combined and contained within a small casing, and inaccessible from the exterior of such casing; such controller being bodily insertable in and removable from a corresponding socket in the meter or machine.

The devices in the controller are so related to devices in the machine that when the controller is removed from the machine the latter cannot be effectively operated. The controller is so small and compact that is can be readily carried in the hand, or in the pocket and much smaller and simpler than the "meter" in my said patented machine. Further the controller is so constructed that none of its mechanisms will be accessible from the outside, therefore it cannot be tampered with and cannot be re-set, except by an authorized person having the proper key.

To facilitate an understanding of the invention I have illustrated one practical embodiment of the invention designed for use in connection with a postage meter machine substantially as shown and described in my Patent #1,370,668, the controller being shown as inserted in a "meter" which can be substituted in said patented machine in place of the meter therein described; but it should be distinctly understood that the removability of the "meter" itself is not a feature of the present invention; and in the present invention the meter can be made an integral or inseparable part of the machine and it is only necessary that the "controller" be removable.

I will describe the embodiment of the invention as illustrated in the drawings which will enable others to understand and adapt the same to other machines. The invention is not restricted to the particular construction or application of the invention illustrated in said drawings, and therefore I refer to the claims for summaries of the essentials of the invention and novel features of construction, and novel combinations of parts, for all of which protection is desired.

Figure 2:
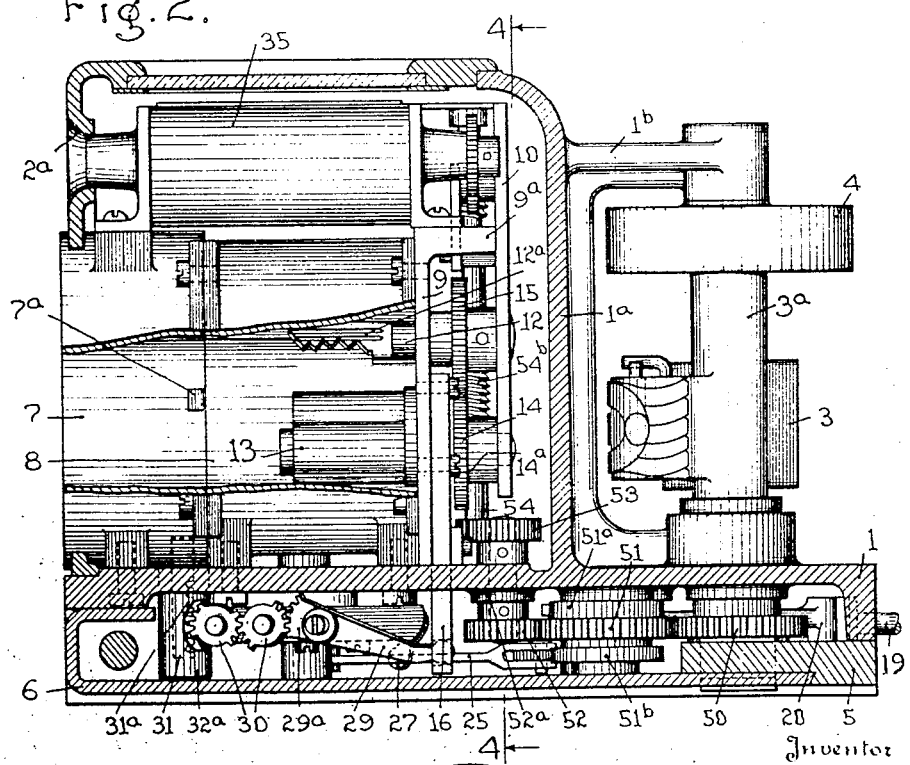
Figure 4:
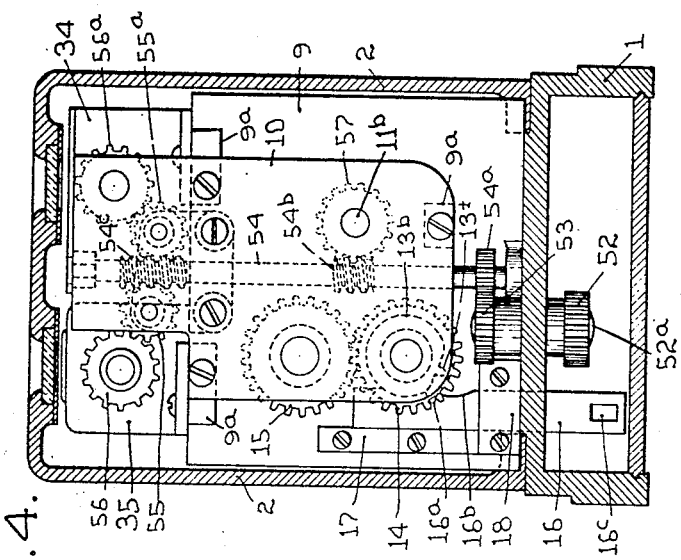
Figure 3:
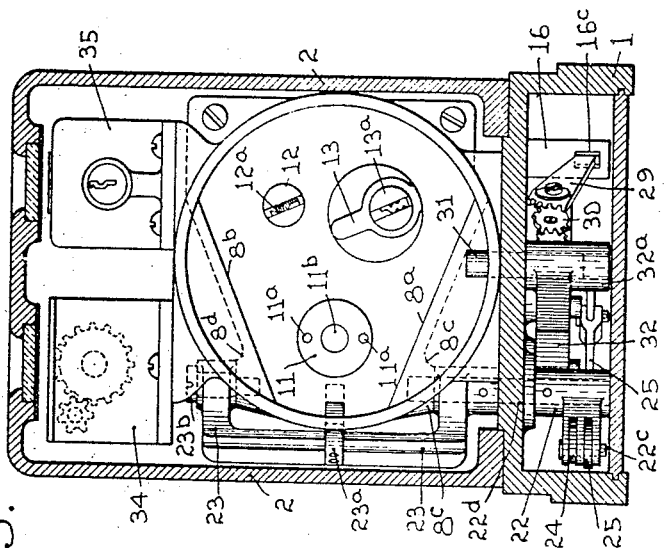
Figure 9:
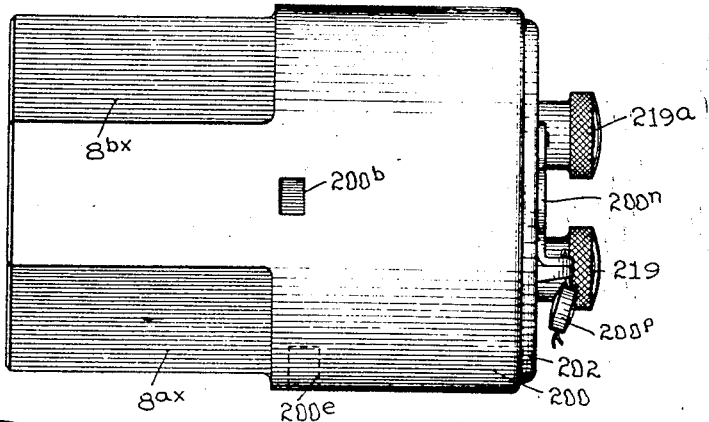
Figure 10:
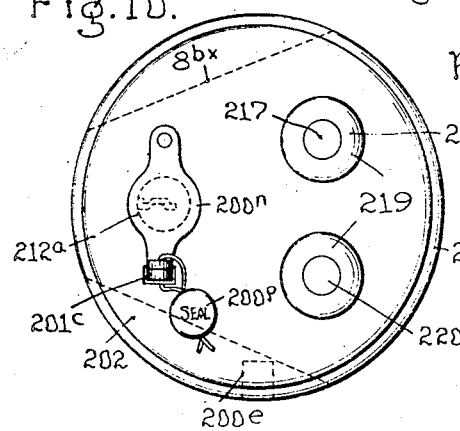
Figure 11:
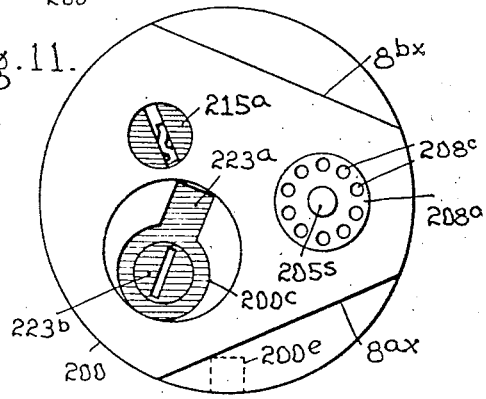
Figure 12:
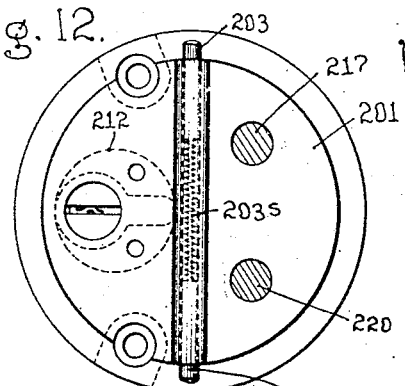
Figure 13:
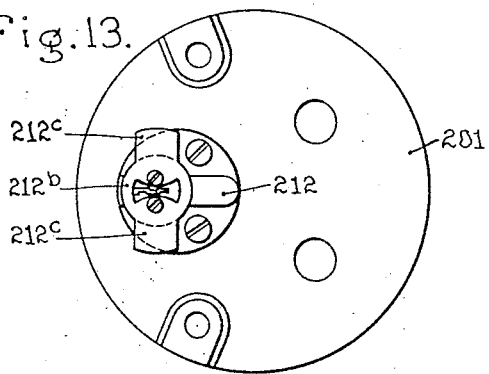
Figure 14:
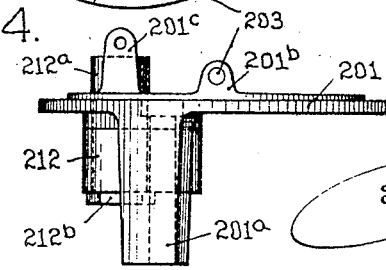
Figure 15:
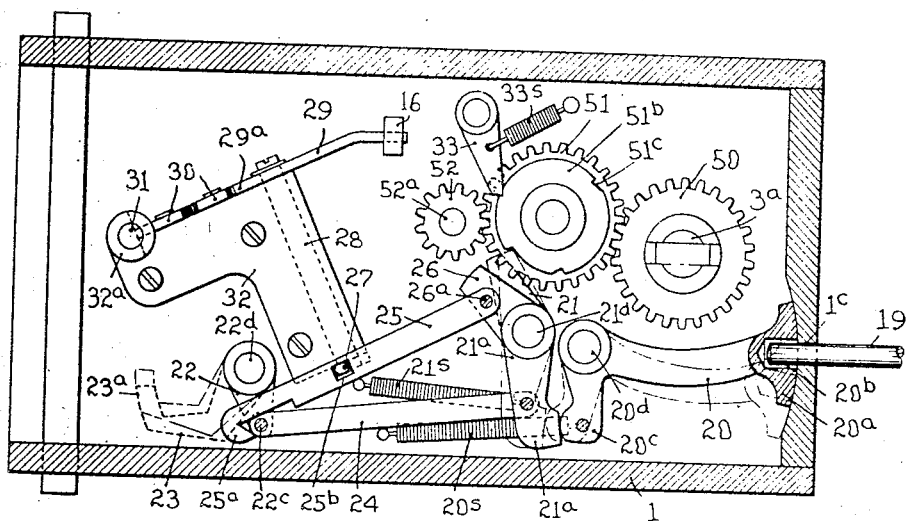
Figure 16:
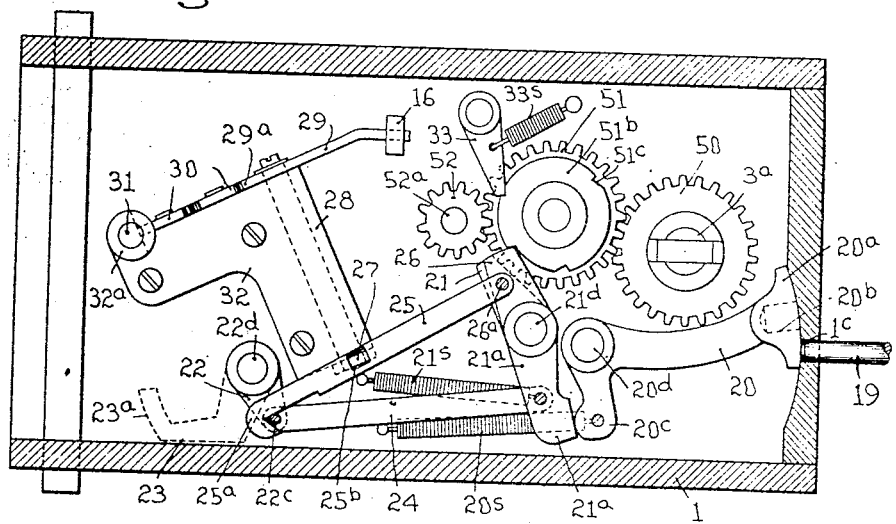

In said drawings:

Fig. 1 is a top view of the meter of the general character of that described in my aforesaid patent, with the "controller" in place thereon. Fig. 2 is a side view of the meter shown in Fig. 1, partly in section to show the interior construction, and the controller being removed. Fig. 3 is a front view of the meter with the controller locked and the front of the meter casing at the base cut away. Fig. 4 is a section on the line 4—4, Fig. 2. Fig. 5 is a front view of the controller with the cover removed. Fig. 6 is a sectional view of the controller casing showing the interior parts in elevation. Fig. 7 is a side view of the interior mechanism of the controller removed from the casing; Fig. 8 is a similar view but reverse to Fig. 7. Fig. 9 is a side view of the complete controller, Fig. 10 is a front view thereof, Fig. 11 is a rear end view thereof. Fig. 12 is a front view of the head of cap, Fig. 13 is a reverse view thereof. Fig. is a side view of this cap. Figs. 15 and 16 are diagrammatical views looking upward showing the locking mechanism and controlling devices in the base of the meter. Fig. 17 is a section through the controller on the line 17—17 of Fig. 18. Fig. 18 is a section through the controller as in place in the meter. Fig. 19 is a face view of disk 205ᵇ. Fig. 20 is a section through the dust guard and housing for lock 13. Fig. 21 is a detail section through the charging mechanism. Fig. 22 is a top plan view of a postage meter machine with the controller applied thereto.

In the accompanying drawings I have shown the controller as applied to one of the "meters" of my so-called postage meter machines such meter being adapted to be substituted in such machine for the meter shown in my Patent #1,370,668 dated March 8, 1921, and I refer others to that patent for a general explanation of the construction and operation of the printing mechanism, the means for feeding the envelopes to the printing mechanism and delivering the same therefrom; which mechanisms form no part of the present invention. The meter shown in the drawings may be removably fitted into said patented machine, or could be permanently attached to such machine; for in the present invention it is not necessary for the meter to be bodily removable as in said patented machine. The meter or machine contains the printing die, and registers by which the number of impressions given off by the die, or the number of revolutions of the die are registered, and in the example shown the meter is made detachable from the machine as a mere matter of convenience.

In Fig. 22 I have illustrated the postage meter machine as shown in my aforesaid patent with the meter and controller applied thereto in place of the meter described in said machine. The envelopes are fed from the table A by rollers B, B' past the sealing device C between forwarding rollers, D, D' and E, E', to and between the printing roller or die 3 on the meter and an impression roller F, and after being printed are discharged between rollers G, G' in front of the stacker H on the delivery table 12. In passing between the rollers E, E' the letters engage a trip finger I which controls mechanism whereby the printer spindle 3ᵃ is operated.

The construction and operation of the parts referred to by reference letters is fully set forth in my Patent #1,370,668 and therefore does not require any more detailed explanation herein, as the particular construction of the letter feeding, forwarding, printing and delivery devices, and the trip mechanism for controlling the operation thereof, are not features of the present invention, and are not specifically claimed herein; but are briefly described and illustrated to show the application of the invention to one practical machine.

*The meter.*

In the construction shown the meter comprises a base 1, containing the various tripping and locking devices hereinafter referred to, upon which is mounted a bracket 1$^a$ having an overhead arm 1$^b$ in which is journaled the upper end of a shaft 3$^a$ the lower end of which is journaled in the base. This shaft carries the printing member or die 3, and an idler roller 4.

A casing 2; fastened to the base 1, encloses the registers 35 and 34 (Figs. 3 and 4); the devices for operating the register, and devices which coact with devices in the controller as hereinafter described. This meter also has a chamber socket for the reception of the removable "controller". As shown this case 2 has two glazed openings 2$^c$ and 2$^b$ in its top adjacent the register and a large circular opening in its front side, which opening is the mouth of the controller socket, from which the controller (in the construction shown) protrudes when in place in the meter. The casing also has a smaller opening 2$^a$ in its front side through which a key may be entered to "clear" the "set back" counter 35. There are no openings in either of the side walls of casing 2. The base 1 with its vertical wall 1$^a$ closes the bottom and rear of the casing so that with the exception of the "controller" socket the casing is completely closed and protects all the interior mechanisms.

The hollow bottom of base 1 is closed by a cap 5, (through which the bottom of die shaft 3$^a$, protrudes), and by a sliding plate 6, which covers all other fastenings in the meter and is itself fastened by inaccessible means f. i. as shown in my aforesaid patent.

The socket in the meter for the controller is formed in two members 7 and 8 (Fig. 2) flanged and fastened together with screws, as shown and provided with lugs on their lower sides secured by screws (as indicated in Fig. 2) to the base 1. The outer member 7 has a cylindric interior forming part of the socket; and the inner member 8 has a cylindric interior, of same diameter as the corresponding portion of member 7, but has two interior flat segmental surfaces 8$^a$, 8$^b$ to conform to the shape of the controller casing and insure accurate positioning of the controller in the socket. The rear end of the controller socket is closed by a plate 9 fastened by screws to flanges on the member 8.

Within the casing 2 and securely attached to the plate 9 by bolts or screws is a plate 10 spaced from the plate 9 by studs 9$^a$. In the space between plates 9 and 10 are placed gears operating a disk 11, a key spindle 12 and the plug 13$^a$ of a lock 13. (See Figs. 2 and 4.) The key-spindle 12 extends through the plate 9 Fig. 2, into the controller socket and has firmly attached to its end a key 12$^a$. The lock 13 is secured to the plate 9 and projects into the controller socket; and the lock fastenings are only accessible from back of plate 9, so that the lock cannot be detached from the outside or through the controller socket.

The disk 11 is secured to a shaft 11$^b$, journaled in the plates 9 and 10 adjacent the key spindle 12 and lock 13. Shaft 11$^b$ carries a pinion 57 by which it is rotated as hereinafter explained. The disk 11 carries two projecting pins 11$^a$ which are adapted to engage and operate the controller mechanism, as hereinafter described, when the controller is inserted in the controller socket.

On the lock plug 13$^a$ is a gear 14 which meshes with a similar gear 15 on the key spindle 12, so that if the key spindle 12 is turned the lock plug would be similarly turned, and vice versa; these gears being disposed between the plates 9 and 10 (see Figs. 2 and 4). Preferably one tooth space of gear 14 or 15, (or of both) is left uncut, so that neither the lock spindle nor lock plug can be turned a complete revolution, thus preventing overturning of the lock plug or key in either direction.

The gearing connecting the die shaft 3$^a$ with the magazine drive and the two counters is shown in Figs. 3, 4 and 15. As shown a gear 50 keyed to die shaft 3$^a$ drives gear 52 through an intermediate 51. Gear 52 is secured to the lower end of a stub shaft 52$^a$ journaled in the top of the base; and a gear 53 secured to the upper end of a shaft 52$^a$ meshes with a pinion 54$^a$ on a shaft 54 vertically disposed between the plates 9 and 10. On shaft 54 is a worm 54$^b$ which drives gear 57 on shaft 11$^b$; and on shaft 54 above worm 54$^b$ is a worm 54$^c$ which drives register 35 by gears 55 and 56, and also drives register 34 by gears 55$^a$ and 56$^a$ (see Fig. 4).

The gear ratio is such that one revolution of the die spindle 3$^a$ will cause the register drive gears 56, 56$^a$ to make $\frac{1}{10}$ revolution and the registers to register one each; and the gear 57 will be revolved a distance equal to one point of the charge disks in the controller; (as hereinafter described) said gear 57 driving disk 11 Fig. 3, which drives the said controller disks.

The registers 34 and 35 which record the number of impressions made by the printing die, 3, are designed to be operative only at such times as a "controller" is fitted into the aforesaid controller socket in casing 2 and properly secured therein; otherwise no printing or registering can be done.

The controller.

The controller comprises charging or "setting" devices, a lock, and a key, contained in a sealed case which is designed to fit into the controller socket in the meter or printing and recording mechanism.

As shown in Figs. 5 to 14 the controller comprises a casing 200 within which is a frame consisting of three plates 204, 204$^a$, and 204$^b$ spaced by distance pieces 204$^c$ and 204$^d$ and fastened together by screws, said frame carrying the operative parts of the controller. The "charging" or "setting" devices of the controller consist of a series of disks 205 (Figs. 7 and 8) mounted between the plates 204 and 204$^a$ on a spindle 205$^s$. The first one of the series of disks 205 is secured to the spindle 205$^s$ to turn with it; but the other disks 205$^a$, 205$^b$ are loosely mounted on said spindle and they are operated by and from the first disk 205 through suitable gear connections.

The gear connections (see Figs. 7 and 8) are exactly similar to those used in the well known geared type of counter, and in brief comprises an intermittent gear 205$^d$ secured to the side of disk 205 and at every revolution of such disk engages and advances a related pinion 207 one point, each pinion 207 being loosely mounted on a spindle 207$^a$, parallel to the spindle 205$^s$ supporting the disks. Each pinion 207 meshes with a spur gear 205$^e$ secured to the side of the adjacent disk 205$^a$ and when gear 205$^e$ is moved one point it moves the related disk 205$^a$ one point. Each disk 205$^a$ of higher denomination also has an intermittent gear 205$^d$ secured to its other side which will, as each complete revolution of such disk, advance a related pinion 207 on spindle 207$^a$ one point; and this pinion 207 will in a similar manner communicate motion to the next disk 205$^a$ of higher denomination, and so through the series. The disk 205$^b$ of highest denomination is shown as substantially thicker than the other disks, and it has a series of radial slots 205$^e$ in its side adjacent the frame plate 204$^a$.

A disk 203 is fastened to spindle 205$^s$ at the outer side of the plate 204, and this disk has a reduced hub portion 208$^a$ which is adapted to protrude through the wall of the case 200 (see Fig. 11) and engage with the pins 11$^a$ on the disk 11 when the controller is inserted in the socket, so that the spindle 205$^s$ and disk 205 will be rotated one point for each revolution of the die 3. This movement is transmitted point by point through the series of disks 205, 205$^a$, 205$^b$, until the last disk 205$^b$ is moved one point, the number of operations of die 3 necessary to effect this movement of disk 205$^b$ depends upon the number of disks in the series, and also on the number of points into which each disk is divided.

This will probably be $\frac{1}{10}$ of a revolution as it is more convenient to have 10 points on each disk though it is not absolutely necessary. At each revolution of the die the unit disk of each register 34, 35 will be moved one unit and the first charge disk 205 in the controller one point toward the number at which it will be discharged.

A "shutter" 209 is loosely mounted on the spindle 205$^s$ between the frames 204$^a$ and 204$^b$, said shutter being preferably cylindrical in shape and having a radial hole 209$^a$ for a purpose hereinafter explained; and a longitudinal slot to accommodate a bar 214 (Figs. 5 and 8) which slides freely in the slot and extends through slots in both frame plates 204$^a$ and 204$^b$. One end of said bar 214 is adapted to be engaged with one of the radial slots 205$^e$ in disk 205$^b$ and its other end is provided with a projecting spur 214$^a$ that engages a cam slot 210$^a$ in a cam 210, loosely mounted on the spindle 205$^s$ exterior to plate 204$^b$. When the cam is turned the cam groove 210$^a$ engaging the spur 214$^a$ on bar 214 will cause the bar 214 to slide back and forth in its slot in the shutter 209.

The slots in both plates 204$^a$ and 204$^b$ through which the bar 214 passes are sufficiently long to allow the bar 214 to be moved laterally by the disk 205$^b$ a distance of one point, which is equal to that between the center of adjacent slots 205$^e$ in disk 205$^b$, and one of whose slots 205$^e$ is normally engaged by the bar 214. And when bar 214 is thus moved by disk 205$^b$ the shutter 209 will also be moved by the bar a distance of one point. The cam 210 is revolved by means of a lock 212 (Figs. 13, 14) as hereinafter described.

This reciprocal movement of the bar 214 serves to first disengage it from the slot 205$^e$ of disk 205$^b$ and then return it; and it is necessary to partly rotate shutter 209 in order that the bar 214 on its return may engage the next adjacent slot 205$^e$. For this purpose cam lever 211 is placed between cam 210 and the plate 204$^b$ (Figs. 5, 7 and 8). This cam lever 211 is pivoted on a frame 204$^b$ at 211$^a$, and extends under cam 210 and has an irregular opening 211$^b$ surrounding the spindle 205$^s$ and the free end has a lug 211$^r$ that touches the bar 214. The cam lever 211 is intermittently oscillated on its pivot 211$^a$ by means of a lug 210$^d$ which projects from the adjacent side of cam 210 and comes in contact with projections 211$^c$ and 211$^d$ in the irregular opening 211$^b$.

The socket 209$^a$ in the cylindrical surface of shutter 209 is adapted to register with a hole 200$^b$ in the controller case 200 (Fig. 9) whenever the bar 214 is moved by disk 205$^b$ to the position illustrated in Fig. 8. When the bar 214 is lifted out of engagement with the slot 205ᵉ (which it then occupies) and shifted as described so that it will engage the next slot 205ᵉ to the left; the shutter 9 will also be shifted with it, and the socket 209ᵃ will be moved out of register with the hole 200ᵇ in case 200. This shifting of shutter 209 to open or close the aperture 200ᵇ controls the locking of the die in the meter as hereinafter described.

When the shutter 209 is rocked to a position in which the socket 209ᵃ will be out of line with the hole 200ᵇ, each operation of the die imparts motion to the disk 205 as described, and after a definite number of operations the disk 205ᵇ will be shifted one point and by reason of the engagement of the bar 214 with both disk 205ᵇ and shutter 209 it also will be turned one point, or in other words restored to the position in which the socket 209ᵃ again registers with the hole 200ᵇ. When in this position the die will be locked and the controller is then said to be "discharged"; i. e., it has allowed the die to be revolved the full number of times, represented by the numbers of points necessary to transfer the motion of the first disk 205 to the last disk 205ᵇ of the series.

The means for "resetting" or "charging" of the controller is guarded by a lock, hereinafter described, secured within the controller, but adapted to be turned by means of a key inserted from the outside of the casing. A swingable guard 200ⁿ is attached to plate 200ᵉ to cover the key hole, and is secured in place by a lead seal 200ᵖ. This lock and seal prevent unauthorized manipulations of the controller.

To further prevent tampering with the controller the entire mechanism of the controller is enclosed in a case 200, and this case is closed in such a way that it cannot be opened without destroying a part of it, thereby leaving plain evidence of its having been tampered with. As shown in Fig. 6 the case 200 is bored to accommodate the parts inserted therein, the plate 204 abuts close on the bottom or inner end of the case. Plates 204 and 204ᵃ are shaped to fit the contour of the reduced part of the bore of the case 200; and plate 204ᵇ is larger and fits the larger part of the bore, and is fastened by screws to a shoulder in the case 200, as shown in Fig. 5. A cap 201, Figs. 5, 12 and 14, closes the open end of case 200, and is provided with lugs 201ᵃ which space it from plate 204ᵇ, and it is held in proper position in the mouth of the opening by screws 201ᵃ passed through lugs 201ᵃ and plate 203 and tapped into the shoulder of the case 200. On the outer face of cap 201 is a projecting rib 201ᵇ which is drilled through; and in the ends of the hole therein are placed slidable pins 203 and a spring 203ᵃ between them forces them outwardly.

A circular cover plate 203 is placed over the cap 201 and has a flange on its periphery with its edge turned in as shown in Fig. 5. This flange fits inside the rim of the case 200, on the machined edge of the cap 201, and its inturned edge is engaged by the pins 203 (forced out by the spring 203ᵉ), and the cover 202 is thus held securely in place. As the pins 203 are inaccessible when the cover 202 is in place there is no way to remove the cover or release its fastenings except by breaking or drilling it.

A lock 212 (Fig. 14) is fastened to the inside of the cap 201, in such position that when the controller is in place the center of the "plug" 212ᵃ of said lock is directly in line with the center of the spindle 205ˢ carrying the disks 205 and shutter 209. The plug 212ᵃ of lock 212 extends through holes in both cap 201 and cover 202 where it is accessible for the purpose of inserting the key (see Figs. 10 and 12). The inner end of plug 212ᵃ is provided with a plate 212ᵇ having arms 212ᶜ and when the parts are properly assembled said arms engage the four pins 210ᶜ of cam 210 (Figs. 5 and 7) and will cause the cam to turn with the plug 212ᵃ.

*Resetting the controller.*

As shown in Figs. 5 and 7 the controller is "discharged" and one full turn of the cam 210 in a contraclockwise direction will "charge" or reset the controller. The combined action of the two cams 210 and 211 is as follows. Cam 210 in turning a little in excess of ¼ revolution will withdraw bar 214 from disk 205ᵇ because the cam groove 210ᵃ during this fraction of a turn leads away from frame 204ᵇ. At this point there is a "dwell" in the lead of the groove 210ᵃ, and while the spur 214ᵃ is traversing this "dwell" the projection 210ᵈ on the under side of cam 210 strikes the shoulder 211ᶜ in the opening of cam 211, forcing it to swing to the left, and the extreme free end of cam 211 will carry the bar 214 to the left; it will then be in a position opposite the slot 205ᵉ next adjoining the one it previously engaged. At this time the lug 210ᵈ will have pushed cam 211 clear of its path and there will be no further movement of cam 211. The "dwell" in the groove 210ᵃ terminates at this point, and the groove begins to lead back towards the frame 204ᵇ, and this will move the bar 214 inward into engagement with the next slot 205ᵉ and when so engaged a second dwell in the groove 210ᵃ holds it there. During this second dwell the lug 210ᵈ in completing its revolution comes into contact with the second shoulder 211ᵈ and returns cam 211 to its original position (as shown in Figure 8) with the lugs 210ᵈ standing where it will prevent further movement of the cam 211.

A second turn of the cam after the foregoing operation has been completed would have no effect whatever on the "charging" its only effect would be to slide the bar 214 back and forth without changing the position of the shutter 209. To prevent any reverse turn of the cam or shutter, ratchet teeth 210ᶜ are cut on a projecting flange 210ᵇ of cam 210 and a pawl 213 engaging such teeth is pivoted on the plate 204ᵇ, as shown in Figs. 5, 7, and 8.

*The various locking devices.*

To secure the charge mechanism and prevent it from being tampered with from the drive end, a lock is provided to shoot a bolt into and securely fasten the driving disk 208. This lock 215 (see Fig. 8) is located between frames 204 and 204ᵃ, and is fastened to frame 204; and its plug 215ᵃ projects through frame 204 into a hole in the rear wall of the controller case, through which hole the key may be inserted.

A rectangular bolt 215ᶜ is mounted to slide in a guide channel in an extended portion 215ᵈ of the lock, and extends through frame 204 and engages one of the slots 208ᵇ machined in the rim of the disk 208 on spindle 205. A cam 216 is secured to spindle 217 adjacent lock 215 and has a worm groove 216ᵃ cut in its surface, and this groove 216ᵃ is engaged by a spur 215ᵉ on the end of bolt 215ᶜ and when the cam is turned the bolt is projected or retracted and operates the bolt. This cam is operated by means of a carrier plate 215ᵇ on the inner end of the plug 215ᵃ, said carrier plate 215ᵇ being similar to the carrier plate 212ᵇ on lock 212, Fig. 13, carrier plate 215ᵇ engages pins 216ᶜ projecting from the hub of the cam 216. The hub 216ᵇ of cam 216 bears in a hole in frame 204ᵃ and holds the cam in correct alignment with the lock 215.

A spindle 217, (Figs. 5 and 7) passes through plate 204ᵇ, cap 201 and cover 202, and is made fast to the hub 216ᵇ of cam 216. This spindle may be manually turned by means of a knurled knob 219ᵃ fastened to its outer end. If it were not for the lock 215, a turn of the knob 219ᵃ would cause the cam 216 to shift the bolt 215ᶜ. When the proper key is inserted in the lock 215 to release the tumblers, its spindle 215ᵃ can be turned either by the knob 219ᵃ or the key.

Another spindle 220, arranged parallel to spindle 217, passes through the cap of the magazine case and the frame 204ᵇ, and has a knurled knob 219, on its outer end; and secured to its inner end is a key 220ᵃ (Fig. 7) designed to fit the lock 13 contained within the controller socket in the meter (Figs. 2 and 7).

A spur gear wheel 218 on spindle 220 meshes with a similar gear 218ᵃ on spindle 217; and the hubs of said gears, fitting between the plate 204ᵇ and cap 201, take the axial thrust in both directions. Both spindles being geared together neither can be turned without turning the other. Preferably one tooth space is left uncut in one or both of the gears 218, 218ᵃ, to limit the extent of rotative movement of the two spindles to something less than a complete revolution.

The lock 13 in the meter, is to be unlocked by the key 220ᵃ on spindle 220; and said lock will enter the controller casing through an opening 200ᶜ therein (Fig. 11) whenever the controller is put in place in the meter. To prevent tampering or the entry of dust or other foreign substances through this hole 200ᶜ, a cylindric housing 222 is provided for the lock within the controller (see Fig. 6) and a dust guard 223ᵃ (Fig. 11) fastened to the end of a tube 223, which slides within the housing 222, closes the hole 200ᶜ when the controller is withdrawn. A revoluble disk 223ᵇ in the dust guard 223ᵃ, is provided with a hole for the passage of key 220ᵃ, and allows the key to be turned in the lock. The telescoping tube 223 has a flange 223ᶜ on its inner end and is normally held in by springs 223ˢ in such position that the dust guard 223ᵃ will be at the extreme end of the housing 222.

The key 220ᵃ in the controller is adapted to engage lock 13 of the meter mechanism; and the key 12ᵃ in the meter is adapted to engage the controller lock 215 and it is the proper interengagement and operation of these locks and keys (which can only take place when the controller is properly seated in its socket in the meter) that renders the mechanisms capable of effective operation.

The lock 13, the key 12ᵃ and the two carrier pins 11ᵃ, all enter the controller when the latter is entered into place in its socket in the meter. The two flat segmental portions 8ᵃ and 8ᵇ in the rear section of the socket fit to similar flattened segmental portions 8ᵃˣ, 8ᵇˣ on the rear end of the controller case (Fig. 9) and insure that the controller is correctly positioned in the socket. The key 12ᵃ being fitted to the lock 215 of the controller and the key 220ᵃ of the controller being fitted to the lock 13 of the meter, the "tumblers" of neither lock will offer any resistance to the turning of the knobs 219, 219ᵃ when the controller is properly placed in the meter. But neither the meter lock nor the controller lock can be operated separately.

*The printer and register locking devices.*

The action of the clutch (not shown) which operates the die shaft 3ᵃ is controlled by a slidable pin 19 as has been described in my aforesaid patent, (Figs. 2, 15 and 16) which is moved to enter a hole 1ᶜ in the base of the meter each time a letter passes through the postage meter machine; and if it is prevented from so entering, the clutch cannot operate and revolve the die. Therefore suitable locking means are provided whereby when the controller is "exhausted" or removed from the meter the hole 1ᶜ will be closed to prevent the entry of pin 19, and whereby as an added precaution the gears in the meter are locked against rotation. These locking means must come into effective operation whenever the controller is removed from the machine and also whenever the controller, when in position in the machine becomes exhausted or discharged.

As shown a bell crank shutter lever is pivoted on a stud 20ᵈ and has a long arm 20 extending to the rear wall of the hollow base 1 where it is provided with an enlarged head the face of which is concentric with the pivot 20ᵈ, and the opposed face of the wall of the base 1 is concaved to allow free oscillating movement of such head. In head 20ᵉ is a hole or socket 20ᵇ which registers with the hole 1ᶜ in the end wall of the base during the normal operation of the machine, to permit the entry of meter pin 19. The shorter arm 20ᶜ of the shutter lever is pulled by a spring 20ˣ against the arm 21ˣ of a lock lever 21, the position of the arm 21ˣ governing the position of the shutter lever arm 20.

The lock lever 21 is pivoted on a stud 21ᵈ in the base of the meter and is designed to be rocked into the path of a projection on a cam 51ˣ, secured to the adjacent gear 51. This cam 51ˣ has exactly the same contour as the cam 51ᵇ attached to the opposite side of said gear (see Figs. 15 and 16). Cam 51ˣ is shown in elevation in Fig. 2, but is hidden in both Figs. 15 and 16, but is of the same shape as cam 51ᵇ. The lock lever arm 21ˣ extends on the side of the pivot 21ᵈ opposite cam 51ˣ, and to arm 21ˣ is fastened a spring 21ˢ, and one end of a link 24, which control its movements. The link 24 is attached at its other end to an arm 22 secured to the lower end of a vertical spindle 22ᵈ (Figs. 3, 15 and 16) which passes through the base, and has its upper bearing in a lug 8ᶜ on the member 8.

Fastened to the upper end of shaft 22ᵈ is the lower end of a trip lever 23 which is approximately U-shaped or bowed to permit its operation at the side of the cylindric member 8 of the controller C.

The upper end of trip lever 23 is pivoted on a shouldered screw 23ᵇ attached to a lug 8ᵈ on the upper side of the magazine seat 8 in alignment with the spindle 22ᵈ. Attached to trip lever 23 is a curved finger 23ˣ bent on an arc whose center is the center line of the pivotal screw 23ᵇ and spindle 22ᵈ, and its free end is adapted to enter a hole 7ˣ in the member 7 (Fig. 2).

The link 24 connecting the lock lever arm 21ˣ with the trip lever arm 22 conveys the pull of the spring 21ˢ to arm 22 spindle 22ᵈ, bracket 23, and finally to the finger 23ˣ, and urges it to enter the hole 200ᵇ in the controller case which it will do when the socket 209ˣ of the shutter 209 is in line, or in other words when the controller is discharged.

When the controller is in place in the meter the hole 200ᵇ (Fig. 9) in case 200 will register with the hole 7ˣ in member 7, and the socket 209ˣ of the shutter 209 whenever the controller is "discharged", therefore when the controller is in place in the meter and it is "discharged", the trip finger 23ˣ will enter the socket 209ˣ in shutter 209: but if and while the controller is "charged" the finger 23ˣ will merely rest on the body of the shutter 209.

The position of the finger 23ˣ governs the position of the lock lever 21, and as lock lever 21 governs the position of the shutter lever 20, the trip finger controls both locking devices, Fig. 15 shows in full lines the position of both shutter and lock lever; and in dotted lines the position of trip lever and finger when the latter is resting on the body of the shutter 209 of the "charged" controller. The point of the lock lever 21 is then clear of the cam 51ˣ and the socket 20ᵇ in the shutter lever 20 is in line with hole 1ᶜ of meter base permitting entry of meter pin 19. When levers 20 and 21 are thus disposed the clutch (not shown) which drives shaft 3ˣ will function and the gears will be revolved at each operation of the die, and the meter will register each operation of the die. When however the controller is "discharged" the trip finger 23ˣ will enter the opening 200ᵇ in the controller case and engage the opening 209ˣ of the shutter 209, and the resultant movement of the trip lever 23 will through the aforesaid connections cause both lock lever 21 and shutter lever 20 to take the positions shown in dot and dash lines Fig. 15. At this time the point of lock lever 21 will be engaged with cam 51ˣ and prevent further revolution of the gears 51, and the socket 20ᵇ in lever 20 will be held out of register with hole 1ᶜ, and the meter pin 19 will therefore be prevented from entering said hole, (see Fig. 16) and therefore the driving clutch cannot function, as described in my aforesaid patent.

The closing of the hole 1ᶜ by the shutter lever 20 is sufficient to prevent further effective functioning of the register, but as an additional precaution against accidental sticking of shutter lever 20, or its failure to close the hole 1ᶜ, the lock lever 21 is provided to effectually lock the gears, and prevent revolution of the die.

The locks just described provide only for the locking of the die when the magazine is "discharged"; but it is also necessary to lock the die when no controller is in place to regulate the position of the trip finger 23ª. It is also necessary to provide means to secure the controller in place in the meter during its operation. To meet this requirement a system of levers is introduced see Figs. 15 and 16 governed only by the coacting controller and meter locks 215 and 13.

A cam 13ᵇ (Fig. 4) is secured to the plug 13ª of lock 13 in the space between plates 9 and 10. Two pins 13ᶜ secured to cam 13ᵇ engage two holes in spur gear 14 and cause the gear to be rotated with it. Gear 14 is loosely mounted on a stud 14ª, secured to plate 10. Spur gear 15 meshing with gear 14 is pinned to key spindle 12 so that a turn of the plug 13ª will cause a turn of spindle 12 and vice versa. The shape of cam 13ᵇ is shown in dotted lines in Fig. 4.

Cam 13 has a tooth 13ᶠ adapted to engage tooth space 16ª in slidable bar 16 which is arranged beside the cam and guided by a bar 17 and strap 18 attached to the plate 9 (see Figs. 2, 3 and 4). By properly turning the cam 13ᵇ bar 16 can be raised or lowered. Two stops 16ᵇ, machined on bar 16 one on either side of tooth space 16ª when engaged with the circular part of cam 13ᵇ will serve to hold the bar 16 in either its "up" or "down" position. The bar 16 passes through an opening in the base 1 into the hollow bottom of the meter where it is connected with the system of locking levers shown in Figs. 15 and 16.

As shown in Figs. 2 and 16 a casting 32 is secured to the under side of the meter base 1 and in this casting is journaled a spindle 28, to the opposite ends of which are firmly secured the levers 27 and 29. Lever 29 (Figs. 15 and 16) is bent near its free end, and engages a rectangular slot 16ᶜ, in the lower end of the sliding bar 16; and when said bar 16 is shifted up or down, the lever 29, spindle 28, and lever 27 will be oscillated.

An auxiliary locking lever 26 is pivoted on the stud 21ᵈ, beside the lock lever 21, and is adapted to engage a cam 51ᵇ on gear 51 in the same manner as lock lever 21 engages cam 51ª, and for the same purpose, namely, to prevent revolving of the gears.

A link 25, is pivoted at one end to lever 26 by the pin 26ª, its other end 25ª, is hooked to engage a pin 22ᶜ, on the trip lever arm 22, (see Figs. 3, 15 and 16). This link 25 is provided with a slot 25ᵇ which is engaged on the free end of the lever 27. The arrangement of these levers is such that when the sliding bar 16 is in its lowermost position (as shown in Fig. 4) the link 25 will be in the position shown in Fig. 15 with its hook-end 25ª clear of the pin 22ᶜ, and the auxiliary lock lever 26 disengaged from the cam 51ᵇ; when the link 25 is in the position shown in Fig. 15 there is enough clearance between the pin 22ᶜ, and the hook 25ª, to allow the pin 22ᶜ sufficient travel to shift the lever 21, to its "dot and dash" position.

When sliding bar 16 is in the "up" position the link 25 will be shifted to the position shown in Fig. 16 and its hook 25ª engage pin 22ᶜ and rock the arm 22, and its other end rock the auxiliary lock lever 26 into engagement with the cam 51ᵇ on gear 51, thereby locking the train of gears. Such rocking of arm 22 will through the connecting link 24 move the lock lever 21 further from engagement with cam 51ª, and also move the shutter lever 20 to head to the opposite side of the hole 1ᶜ to that shown in dot and dash lines in Fig. 15. This new position of levers 20 and 21 is just as effectual as the other in locking the register however as the hole 1ᶜ will still be closed, and although lever 21 is out of engagement with cam 51ª the auxiliary lock lever 26 is engaged with cam 51ᵇ and locks the gear 51. This movement of the arm 22 by the link 25 also causes the trip finger 23ª to be entirely withdrawn from the controller seat 7, leaving the passage clear for the withdrawal of the controller. (The three positions of the trip finger 23ª are indicated by dotted lines in Fig. 3.)

*Locking the controller in place.*

The controller can be held securely in its place in the socket by a bolt 31 slidably mounted in a boss 32ª of the casting 32. This bolt is operated by the lever 29 which has a gear toothed sector 29ª (see Figs. 2, 3 and 16) engaging one of a train of segments 30 (Fig. 2) the last of which engages rack teeth 31ª cut in the lower end of bolt 31, so that the bolt 31 is raised or lowered by the oscillation of bolt 29. The boss 32ª extends through a hole in the meter base 1, and the bolt 31 projects through a smaller hole in the bottom of the magazine seat 7. The lever 29 and gears 30 are so arranged that the bolt 31 will be projected through the controller socket member 7, and into a hole 200ᶜ (Figs. 9, 10 and 11) in the controller case 200, when the sliding bar 16 is lowered and all levers are in the position shown in Fig. 15, in either dot and dash or full lines. When bar 16 is in the "up" position the bolt 31 will be withdrawn from the controller and all levers will be in the position shown in Fig. 16.

The locking of the meter by the arrangement of the levers shown in Fig. 15 is controlled entirely by the bar 16 which is operated by turning the lock 13; and the lock 13 can only be operated when a controller is properly placed in position in the meter. When the controller is so placed, the lock 13 can be turned by turning either one, or both of the knobs 219, 219ª, which will also turn lock 215 in the controller. At all other times when a controller is not placed in the socket and locked in position, the meter locking levers are in the positions shown in Fig. 16, with the trip finger 23ª and bolt 31 withdrawn from the controller socket.

To prevent the die being turned in a reversed direction a pawl 33 actuated by a spring 33ª is provided to engage three ratchet teeth 51°, cut in the periphery of cam 51ᵇ, as shown in Figs. 15 and 16.

*Placing the controller.*

The controller is positioned in the machine as follows. The smaller end of the controller is entered into the socket and the controller pushed in as far as it will go. In so doing the lock 13 is carried to enter the hole 200° in the case 200ª (Fig. 11; and the carrier pins 11ª will engage two of the holes 208° in the driving disk 208 of the controller, and key 12ª will enter keyhole in plug 215ª. The keys of both locks 215 and 13 being in place, both may be turned by turning the knobs 219, 219ª on the front side of the magazine. Such turning of the knobs will release the charging mechanism in the controller by withdrawing bar 215° out of engagement with the slot in the disk 208; and moving the sliding bar 16 to its "down" position: and by reason of the connecting levers just described the bolt 31 will be moved into engagement with the hole 200° in the controller case, thus securing the controller in place; and at the same time the trip finger 23ª is released as that it will try to enter the magazine through the hole 200ᵇ; also the auxiliary lock lever 26 is withdrawn from contact with cam 51ᵇ, and lock lever 21 and shutter lever 20 are permitted to take either of the positions shown in Fig. 15. If the controller is "charged" the head and lever 20 will take position shown in full line; but if the controller is "discharged" said head will take the dot and dash position. The controller cannot be withdrawn from the meter without reversing all of the aforesaid operations; and when so withdrawn will leave the meter locked as it was in the beginning, with the levers in the positions shown in Fig. 16. As previously explained the meter will be locked upon the discharge of the controller.

The disk 205ᵇ is shown detached in Fig. 20, which shows the radial slots in the disk and t' rivets fastening it to spur gear 205°; this disk also appears in section in Fig. 21; which is a section through the dust guard and housing for lock 13. The parts shown in Fig. 21 are shown in different positions in Fig. 18. The controller is shown in section as in place in the meter, in Fig. 18, and this figure shows the co-acting locks 215 and 13 with their keys in place; also the connection between gear 14 and cam 13ᵇ. It is impossible to show how cam 13ᵇ is secured to plug 13ª in this section (Fig. 18) but Fig. 13 shows how carrier 212ᵇ is fastened to plug 212ª and this fastening is identical with the fastening of cam 13ᵇ to 13ª and also carrier 215ᵇ and 215ª.

Fig. 21 is a section through the charging mechanism showing the drive 11 pins 11ª engaging disk 208, the bar 214 engaging cam 210 and slot 205° of disk 205ª, the pins 210° engaging the carrier plate 212° of lock 212, and bolt 215° engaging a slot in disk 208. The slot for bar 214 in frame plate 204ª is an open slot as shown in Fig. 8, the wall of the case 200 forming the other side.

The arrangement of the locks as shown in sectional view Fig. 17, but in said figure the plugs are partly turned in order to show more clearly in the related Fig. 18. The plugs being geared together should be turned in opposite directions, but for the purpose of illustration, were drawn as shown in Fig. 17. The frame plate 204ª is cut away to allow the passage of the telescoping dust guard 223.

The reason the frame plates 204ᵈ, 204ª, appear to be imbedded in the case 200 in Fig. 6, is because the case 200 only, is in section, and the frame lying in front of the plane of the section is projected over the sectioned part of the case. The screws 201ᵇ lying beyond the plane of the section are consequently shown in dotted lines only.

*In general.*

Of the two counters in the meter the one marked 34, Figs. 1 and 3, is designed to register the total output of the meter. It is of the geared type, and inaccessible. It will register 9,999,999 and clear to zero upon reaching 10,000,000, when it will start over again. The other counter, 35, is what is known as a "set back" counter that is, it may be cleared to zero at any time during its count, by inserting a key through an opening 2ª in the meter case 2 for that purpose. It is introduced to enable the user to readily prepare his statement of mail, when the meter is used in a postage meter machine.

The number of "points" in the disks 205; 205ª; 205ᵇ; is the radix or root, and the number of disks in the series is the exponent of the power to which the root is raised. In the drawings I have shown three disks 205, 205ª, and 205ᵇ which must be moved before movement is communicated to disk 205ᵇ. If there are nine points it will be $9^3$, or 729.

If there are eight points it will be $8^3$, or 512. Preferably I use the number 10 as a root, but the possibility of using other root numbers illustrates the distinction between the controller device and the ordinary consecutive numbering device.

It will be seen that in this invention the locking and controlling mechanism is contained in a removable inaccessible case or controller. Each controller of a given denomination will have a key that unlocks only the meters of corresponding denomination; this will enable the Post Office Department to collect in advance the proper amount of money for a given number of impressions of a certain denomination, otherwise it might be possible to have a 2¢ controller charged at the post office and bring it back to the user's office and insert it in a meter having an engraved die of higher value, and thereby defraud the Government.

The removable controllers, being smaller in size and less expensive to manufacture than the meters as shown in my said patent will make it possible for a user to purchase larger quantities of postage with a feeling of greater security as the controllers can be readily put away for safe keeping in less space in the safe at night than might otherwise be possible if a like number of meters had to be stored away in a limited amount of room.

This invention also enables the Post Office Department to carry a reserve stock of controllers on hand instead of a full assortment of meters, it being a simple matter to make the controller of different capacities.

It would also be possible with a controller of this kind to build the meter in the machine, and it is not necessary to have the meters detachable; as provided in my said patent. In other words the machines could be constructed with either a single socket or a plurality of sockets to accommodate controllers of different denominations, that would register an amount corresponding with the value of the impressions of a number of different dies each controlled by its related controller.

When used in postage meter machines each controller will preferably have a serial number, the same as a watch, revolver, etc., for the purpose of record and identification, and also another number indicating its capacity; and also another number indicating the denomination of the meter or machine with which it is to be used, so as to insure payment of the proper amount of money for postage.

The controller having no internal numbering mechanism, requires no windows for sight reading, and in that respect somewhat resemble a cartridge or fuse plug with hidden mechanism designed, through proper gearing, to cease functioning after a certain number of revolutions have been effected, at which time, a small aperture is opened to permit the entry of the lock-lever trip within the meter. The controller is also so shaped and designed so that it must be inserted in the proper socket and in proper position to make connection. The provision of a necessarily operated key within the controller precludes the possibility of operating the meter or machine after the controller has been removed therefrom. In fact the controller cannot be removed without first turning the key, as above explained and the turning of such key closes the shutter in the meter that controls the action of the so-called meter pin, the free movement of which releases the clutch that operates the die. The same result is effected as above explained when the controller has been exhausted, in which event the action as above described is automatic.

In prior machines the controlling mechanism is in reality actuated by the numbering wheels themselves, but in this invention the controller contains no numbering mechanism, but merely so much clock work, and is an essentially different proposition.

Furthermore the controller is not a meter for there is no way of determining from viewing the controller alone, how many operations have been effected or how many yet remains before it ceases to function. It is therefore not a meter or measuring device, but simply a controlling device separate and removable from the meter or machine which contains the registers that indicate the amount of postage used and amount yet remaining to be used, on last purchase.

In the controller shown I have provided a series of geared disks, each actuated the same as a geared counter, but the disks used have no numerals or other marks on their peripheries as in the case of counter wheels, neither is it essential that the divisions be divisional; but on the contrary they could be divided into any other number as hereinbefore stated. In the latter event the total would not necessarily be a multiple of 10, the base of our present decimal system, but would be in multiples of the radix of the system chosen say 8, 9, etc., and it is not necessary to adhere to the decimal system in order for the controller to cause the locking mechanism to function after any given number of operations have been effected.

In other words no one can tell, from looking at the controller how many operations have been made or how many yet remain; all they can know is that each controller may be "set" at its capacity and that when the machine has completed the related number of operations it will automatically release the locking mechanisms within the meter or machine.

The meter as shown has two registers visible, through small glass windows in the top of the housing. One of these counters represents the "grand total" to date and runs up to 10,000,000 before automatically clearing to zero. The other is a "set-back" counter and also operates in an ascending series, and is intended merely as a convenience for the operator in keeping count of the number of pieces of each batch of mail passed through the machine, or in each day's mailing or in any given period, in order to keep an accurate record thereof; and it can be turned back by hand to zero at the beginning of each new count.

By noting and keeping a record of what the meter reads when a "reset" controller is inserted in the machine it would not be a difficult matter to tell at any time how many operations are still permissible, and by subtracting one reading of the meter from another it could be readily determined how many pieces were mailed at a time. In other words there is no necessity, with machines of this type to have a descending counter to indicate how many impressions still remain although such may be used if desired.

The total counter will indicate at all times how many operations have been performed with that meter, or machine regardless of how many separate controllers may have been used in connection therewith and should always correspond with the total additions or capacities of the various controllers used and exhausted in that meter or machine. These matters are mentioned merely to show that the so-called controller is not a meter but provides an entirely new method and means of control.

I claim—

1. For a machine of the character specified having a meter, a removable controller adapted to be placed in the meter or removed therefrom, and means whereby when the controller is inserted in the meter the latter will be rendered operative, and when the controller is removed from the meter it is rendered inoperative.

2. In mechanism as set forth in claim 1, means in the controller whereby the number of effective operations of the machine is limited.

3. In mechanism as set forth in claim 1, means in the controller whereby when such controller is in the machine a certain number of operations may be performed by the machine.

4. In mechanism as set forth in claim 1, means in the controller whereby when such controller is in the machine a certain number of operations may be performed by the machine, and when such number of operations is performed further effective operations of the machine is prevented until the controller is removed, reset and replaced.

5. In a machine of the character specified, having a printing mechanism, means for registering the operation of the printing mechanism, means for locking the printing mechanism and the registering mechanism; a removable controller adapted to be placed in the machine or removed therefrom, and means whereby when the controller is inserted in the machine the aforesaid locking means will be rendered inoperative, and when the controller is removed from the machine said mechanism is rendered operative.

6. In mechanism as set forth in claim 5, means in the controller whereby the number of effective operations of the machine is limited.

7. In mechanism as set forth in claim 5, means in the controller whereby when such controller is in the machine a certain number of operations may be performed thereby.

8. In mechanism as set forth in claim 5, means in the controller whereby when such controller is in the machine a certain number of operations may be performed by the machine and when such number of operations is performed further effective operations of the printing and registering mechanisms is prevented until the controller is removed and reset.

9. In a machine of the character specified, having a printing mechanism, means for operating such mechanism, a registering mechanism, means for operating the registering mechanism once for each operation of the printing mechanism, and means for locking the printing mechanism; a removable controller adapted to be placed in the machine or removed therefrom, and means in said controller whereby when it is inserted in the machine the aforesaid locking means will be rendered inoperative and when the controller is removed from the machine said locking means is rendered operative, substantially as described.

10. In mechanism as set forth in claim 9, means in the controller whereby the number of effective operations of the machine is limited.

11. In mechanism as set forth in claim 9, means in the controller whereby when such controller is in the machine a certain number of operations may be performed thereby.

12. In mechanism as set forth in claim 9, means in the controller whereby when such controller is in the machine a certain number of operations may be performed by the machine and when such number of operations have been performed further effective operations of the printing and registering mechanisms is prevented until the controller is removed and reset.

13. In mechanism of the character specified, a printing mechanism, a registering mechanism and gearing between the printing and registering mechanism whereby the register is operated for each operation of the printer; with a removable controller adapted to be placed in the machine or removed therefrom, and means whereby when the controller is inserted in the machine the latter will be rendered operative and when the controller is removed from the machine it is rendered inoperative.

14. In mechanism as set forth in claim 13, means in the controller whereby the number of effective operations of the machine is limited.

15. In mechanism set forth in claim 13, means in the controller whereby when such controller is in the machine a certain number of operations may be perfomed by the machine.

16. In mechanism as set forth in claim 13, means in the controller whereby when such controller is in the machine a certain number of operations may be performed by the machine, and when such number of operations is performed further effective operation of the machine is prevented until the controller is removed, reset, and replaced.

17. In mechanism of the character specified, a printing mechanism, a meter adjacent the printing mechanism, a registering mechanism, a socket, and gearing between the printing and registering mechanism whereby the register is operated for each operation of the printer; with a removable controller adapted to be placed in the said socket or removed therefrom, and means whereby when the controller is inserted in the socket the printing and registering mechanisms will be rendered operative and when the controller is removed from the machine they are rendered inoperative.

18. In mechanism as set forth in claim 17, means in the controller whereby the number of effective operations of the machine is limited.

19. In mechanism as set forth in claim 17, means in the controller whereby when such controller is in the machine a certain number of operations may be performed by the machine.

20. In mechanism as set forth in claim 17, means in the controller whereby when such controller is in the machine a certain number of operations may be performed by the machine, and when such number of operations is performed further effective operation of the machine is prevented until the controller is removed, reset, and replaced.

21. In mechanism of the character specified, a printing mechanism, a meter having registering mechanism and a socket, gearing between the printing and registering mechanism whereby the register is operated for each operation of the printer, and devices for locking the printing mechanism and the meter registering mechanism; with a removable controller adapted to be placed in the socket or removed therefrom, and means whereby when the controller is inserted in the socket the said locking devices will be rendered inoperative, and when the controller is removed from the machine they are rendered operative.

22. In mechanism as set forth in claim 21, means in the controller whereby the number of effective operations of the machine is limited.

23. In mechanism as set forth in claim 21, means in the controller whereby when such controller is in the socket a certain number of operations may be performed by the machine.

24. In mechanism as set forth in claim 13, means in the controller whereby when such controller is in the socket a certain number of operations may be performed by the machine, and when such number of operations is performed further effective operation of the machine is prevented until the controller is removed, reset, and replaced.

25. In a machine of the character specified, a printer, a controller socket in the machine, a lock in said socket, a key in the socket beside said lock, gearing between the lock and the key; a rotatable member in said socket adjacent the lock and key, and gearing whereby said member is driven in unison with the printer; with a controller adapted to be inserted in said socket or removed therefrom; means carried by the controller adapted to engage said key; a key carried by said controller adapted to engage the said lock when the controller is inserted in the socket; setting devices in said controller, means adapted to engage the said rotatable member so that the disk setting devices are operated thereby when the controller is inserted in the socket; and means in said controller whereby when the printer has made a pre-determined number of operations said devices will be locked.

26. In combination with mechanism as set forth in claim 25, means whereby when the said devices are locked the printer and the register are rendered inoperative.

27. In combination with mechanism as set forth in claim 25, means whereby when the controller is removed from the machine the printer and the register are rendered inoperative.

28. In combination with mechanism as set forth in claim 25, means whereby when the said devices are locked the printer and the register are rendered inoperative; and means whereby when the controller is removed from the machine the printer and register are render inoperative.

29. In a machine of the character specified, a printer, a register, a lock, a controller socket in the machine, a key in the said socket beside said lock, gearing between the lock and the key, a rotatable member in said socket adjacent the lock and key, and gearing whereby said member is driven in unison with the printer; with a controller adapted to be inserted in said socket or removed therefrom; a key carried by said controller adapted to engage the said lock when the controller is inserted in the socket; setting devices in the controller; means carried by the controller adapted to engage the said rotatable member so that the setting devices are operated thereby when the controller is inserted in the socket; means for locking the said devices when the controller is removed from the machine; and a second lock controlling said locking means adapted to be engaged by the key in the socket when the controller is inserted therein to release the said disks.

30. In mechanism as set forth in claim 29, means in said controller whereby when the printer has made a pre-determined number of operations said devices will be locked.

31. In combination with mechanism as set forth in claim 29 means whereby when the said devices are locked the printer and the register are rendered inoperative.

32. In combination with mechanism as set forth in claim 29 means whereby when the controller is removed from the machine the printer and the register are rendered inoperative.

33. In combination with mechanism as set forth in claim 29 means whereby when the said devices are locked the printer and the register are rendered inoperative; and means whereby when the controller is removed from the machine the printer and register are rendered inoperative.

34. In a machine of the character specified, a printer, a register, means for locking said printer and said register, a lock controlling said means, a key adjacent said lock, gearing between the lock shaft and the key shaft; a rotatable member, and gearing whereby said member is driven in unison with the register and printer; with a controller adapted to be inserted in or removed from the machine; a key carried by said controller adapted to engage the said lock when the controller is inserted in the machine; devices adapted to be operated by the said rotatable member when the controller is inserted in the machine, and a second lock controlling said devices adapted to be engaged by the key when the controller is inserted in the machine; and means in said controller whereby when the printer has made a pre-determined number of operations said devices will become locked.

35. In combination with mechanism as set forth in claim 34, means whereby when the said devices are locked the printer and the register are rendered inoperative.

36. In combination with mechanism as set forth in claim 34 means whereby when the controller is removed from the machine the printer and the register are rendered inoperative.

37. In combination with mechanism as set forth in claim 34 means whereby when the said devices are locked the printer and the register are rendered inoperative and means whereby when the controller is removed from the machine the printer and the register are rendered inoperative.

38. In a machine of the character specified, a printer, a register, means for locking said printer and said register, a lock controlling said means, a key adjacent said lock, gearing between the lock shaft and the key shaft, a rotatable member, and gearing whereby said member is driven in unison with the register and printer; with a controller adapted to be inserted in or removed from the machine; a key carried by said controller adapted to engage the said lock when the controller is inserted in the machine; a series of inter-related disks in said controller adapted to be operated by the said rotatable member when the controller is inserted in the machine and a lock controlling said disks adapted to be engaged by the key in the socket when the controller is inserted in the machine; and means in said controller whereby when the printer has made a pre determined number of operations said disks will become locked.

39. In combination with mechanism as set forth in claim 38 means whereby when the disks are locked the printer and the register are rendered inoperative.

40. In combination with mechanism as set forth in claim 38 means whereby when the controller is removed from the machine the printer and the register are rendered inoperative.

41. In combination with mechanism as set forth in claim 38 means whereby when the disks are locked the printer and the register are rendered inoperative and means whereby when the controller is removed from the machine the printer and the register are rendered inoperative.

42. In combination with mechanism as set forth in claim 38, means controlled by said locking devices whereby when the disks in the controller are locked the printer and register will be rendered inoperative until the controller is removed, reset and replaced in the machine.

43. In combination with mechanism as set forth in claim 38, means whereby when the controller is removed from the machine the printer and the register are locked, and means controlled by said locking means whereby when the disks in the controller are locked the said printer and said register will be rendered inoperative until the controller is removed, reset and replaced in the machine.

44. In a machine of the character specified, a printer, a register adjacent the printer, gearing between the printer and register whereby the latter is operated for each operation of the printer; a controller socket in the machine a lock in said socket, a key in the said socket beside said lock, gearing between the lock shaft and the key whereby the key is turned by the lock; a rotatable member in said socket adjacent the lock and key, and gearing whereby said member is driven in unison with the register and printer; with a controller adapted to be inserted in said socket or removed therefrom; a key carried by said controller adapted to engage the said lock when the controller is inserted therein; a series of inter-related disks in said controller, means in the controller adapted to engage the said rotatable member so that the disks are operated thereby when the controller is inserted in the socket, means for locking the said disks when the controller is removed from the machine, and a second lock controlling said disk locking means adapted to be engaged by the key in the socket when the controller is inserted therein to release the said disks.

45. In mechanism as set forth in claim 44 means in said controller whereby when the printer has made a pre-determined number of operations said disks will become locked.

46. In combination with mechanism as set forth in claim 44 means whereby when the said disks are locked the printer and the register are rendered inoperative.

47. In combination with mechanism as set forth in claim 44, means whereby when the controller is removed from the machine the printer and the register are rendered inoperative.

48. In combination with mechanism as set forth in claim 44, means whereby when the said disks are locked the printer and the register are rendered inoperative; and means whereby when the controller is removed from the machine the printer and register are rendered inoperative.

49. In combination with mechanism as set forth in claim 44, means controlled by said locking devices whereby when the disks in the controller are locked the printer and register will be rendered inoperative until the controller is removed, reset and replaced in the machine.

50. In combination with mechanism as set forth in claim 44, means whereby when the controller is removed from the machine the printer and the register are locked, and means controlled by said locking means whereby when the disks in the controller are locked, the said printer and said register will be rendered inoperative until the controller is removed, reset and replaced in the machine.

51. In a machine of the character specified, having a printer, a meter containing a register adjacent the printing mechanism and having a controller socket, gearing between the printer and meter whereby the register is operated for each operation of the printing mechanism; devices for locking said printer and register; a lock in the socket; a key projecting into the said socket beside said lock, gearing between the lock shaft and the key shaft; a rotatable member in said socket, and gearing whereby said member is driven in unison with the register and printer; with a controller adapted to be inserted in said socket or removed therefrom; a key carried by said controller adapted to engage the said lock when the controller is inserted in the socket; a series of inter-related disks in said controller, means in the controller adapted to engage the said rotatable member so that the disks are operated thereby when the controller is inserted in the socket; means for locking the disks when the controller is removed from the machine; a second lock controlling said locking means and adapted to be engaged by the key in the socket when the controller is inserted in the socket; and means in said controller whereby when the printer has made a pre-determined number of operations said disks will become locked.

52. In mechanism as set forth in claim 51 means whereby when the controller is removed from the socket the printer and the register are rendered inoperative.

53. In mechanism as set forth in claim 51 means whereby when the controller is removed from the socket the printer and the register are locked, and means controlled by said locking means whereby when the disks in the controller are locked the said printer and said register will be rendered inoperative until the controller is removed from the socket, reset and replaced in the socket.

54. In a controller for the purpose specified, a case, a spindle therein, a series of disks on said spindle, one of said disks having a series of slots, carry-over devices between the disks, a member adapted to engage the slots in said disk, and means adapted to operate the member.

55. In combination with devices as set forth in claim 54, means in the case for locking the disks independently of said member.

56. In a controller for the purpose specified a case, a spindle therein, a series of disks on said spindle, one of said disks having a series of slots, carry-over devices between the disks, a member adapted to engage the slots, means adapted to operate the member; and a shutter movably mounted on the spindle and having a slot for the engagement of said member, said shutter being operated by the movements of said member.

57. In a controller for the purpose specified, a case, a spindle therein, a series of disks on said spindle, a notched disk on the spindle, a member adapted to engage said disk, a lock and a cam controlled by the lock adapted to operate the said member.

58. In a controller for the purpose specified, a case, a spindle therein, a series of disks on said spindle one of said disks having a series of slots, carry-over devices between the disks, a member adapted to engage the slots, a cam adapted to operate the member; a second notched disk on the spindle, a second member adapted to engage the said second disk and means adapted to operate the said second member.

59. A controller for the purpose specified comprising a case, a spindle therein, a series of disks on said spindle, carry-over devices between the disks, a member adapted to lock the disk, a cam adapted to operate said member; a shutter having a slot for the engagement of said member, said shutter being adapted to be operated by the said member; a notched disk on the spindle, a second member adapted to engage the said disk, and means to operate the said second member, substantially as described.

60. In a controller for the purpose specified, a case, a spindle therein, a series of disks on said spindle one of said disks having a series of slots carry-over devices between the disks, a sliding bar adapted to engage the slots in said disk, and a cam adapted to reciprocate the bar.

61. In combination with devices as set forth in claim 60, means in the case for locking the said spindles or disks independently of said bar.

62. In a controller for the purpose specified, a case, a spindle therein, a series of disks on said spindle, one of said disks having a series of slots, carry-over devices between the disks, a sliding bar adapted to engage the slots, a cam adapted to reciprocate the bar; a shutter rotatably mounted on the spindle between the cam and the slotted member and having a slot for the engagement of said bar, said shutter being operated by the lateral movements of said bar.

63. In a controller for the purpose specified, a case, a spindle therein, a series of disks on said spindle, a notched disk on the spindle, a bar adapted to engage the said disk, a lock beside said bar, and a cam operated by the lock and adapted to operate the said bar.

64. In a controller for the purpose specified, a case, a spindle therein, a series of disks on said spindle, one of said disks having a series of slots, carry-over devices between the disks, a sliding bar adapted to engage the slotted disk, and a cam member adapted to reciprocate the bar; a notched disk on the spindle, a lock bar adapted to engage the said notched disk, and a cam member operated by the lock and adapted to operate the said lock bar.

65. A controller for the purpose specified comprising a case, a spindle therein, a series of disks on said spindle, carry-over devices between the disks, a sliding bar adapted to lock the disk, a cam member adapted to reciprocate the bar; a shutter rotatably mounted on the spindle adjacent the cam and having a slot for the engagement of said bar, said shutter being adapted to be operated by the lateral movement of said bar; a notched disk on the spindle, a bar adapted to engage the said disk on the spindle, a bar adapted to engage the said disk, a lock, and a cam member operated by the lock and adapted to operate said bar, substantially as described.

66. In a controller for the purpose specified a case containing operative mechanism, a cap for closing the case, spring projected pins on said cap, and a plate over the cap having a flange with an inturned edge adapted to be engaged by the pins to seal the case.

67. In a controller for the purpose specified, a case, a spindle therein, a series of disks on said spindle, one of said disks having a series of slots, carry-over devices between the disks, a member adapted to engage the slots in said disk, and means adapted to operate the member, with a cap closing the case and having an opening for the projection of the spindle, and a plate over the cap and means to movably secure the plates in place to seal the case.

68. In mechanism of the character specified, a meter having a controller socket, registering mechanism in the meter, means for operating the registering mechanism; and a lever adapted to lock the controller in the socket; with a removable controller adapted to be inserted in said socket and locked by said lever.

69. In a character for the purpose specified a meter having a controller socket; a controller comprising a case, a spindle therein, a series of disks on said spindle one of said disks having a series of slots, a member adapted to engage the slotted disk; means adapted to operate the member; and a shutter having a slot for the engagement of said member, said shutter being operated by the said member; with an oscillating lever having a finger adapted to be projected into the controller socket and engage the shutter when the disks are locked, substantially as described.

70. In mechanism of the character specified, a meter having a controller socket, and a bolt adapted to be projected into said socket to lock the controller therein; with a removable controller adapted to be inserted in said socket and locked by said bolt.

71. In mechanism of the character specified, a meter having a controller socket, and containing registering mechanism, means for operating the registering mechanism, and a bolt adapted to project into said socket to lock the controller therein; with a removable controller adapted to be inserted in said socket and locked by said bolt.

72. In mechanism of the character specified, a meter having a controller socket, registering mechanism in the meter, and means for operating the registering mechanism; with a removable controller adapted to be inserted in said socket, and a bolt adapted to be projected into the socket and engage the controller to lock the controller in the socket; and means for operating said bolt.

73. In a controller for the purpose specified a case, a spindle therein, a series of disks on said spindle, one of said disks being slotted, a member adapted to engage such slotted disk, a cam adapted to operate said member, means for locking the said spindle, means for controlling said locking means, and means whereby when the controller is inserted in operative position such lock is unlocked.

74. In a controller for the purpose specified a case, a spindle therein, a series of disks on said spindle, one of said disks having a series of slots, carry-over devices between the disks, a sliding bar adapted to engage the slots, a cam adapted to reciprocate the bar; a shutter rotatably mounted on the spindle between the cam and the slotted member and having a slot for the engagement of said bar, said shutter being operated by the lateral movements of said bar, means of locking the said spindle, a lock controlling said locking means, and means whereby when the controller is in operative position such lock is unlocked.

75. In a machine of the character specified having a controller socket; a controller casing adapted to be fitted in said socket, a spindle in the casing, and a lock controlling the rotation of said spindle; with a key projecting into the socket and adapted to engage said lock and permit the release of the spindle when the controller is inserted in the socket.

76. In a machine of the character specified having a controller socket; a controller casing adapted to be fitted in said socket, a spindle in the casing, and a lock controlling the rotation of said spindle; a second spindle in the casing, and a key carried by said second spindle with a key projecting into the socket and adapted to engage said lock and permit the release of the first spindle when the controller is inserted in the socket, and a second lock projecting into the socket and adapted to be engaged by the key on the second spindle when the controller is inserted in the socket.

77. In a machine of the character specified having a controller socket: a controller casing adapted to be fitted in said socket, a spindle in said controller, a series of disks on said spindle, a member adapted to engage one of the disks, a cam adapted to operate the member, and a lock controlling the rotation of said spindle: with a key projecting into the socket and adapted to engage said lock and permit the lock to be operated to release the spindle when the controller is inserted in the socket.

78. In a machine of the character specified having a controller socket: a controller casing adapted to be fitted in said socket, a spindle in said casing, a series of disks on said spindle, a member adapted to engage one of the disks, a cam adapted to operate the member, and a lock controlling the rotation of said spindle; and a second spindle in the casing with a key projecting into the socket and adapted to engage said lock and permit the release of the spindle when the controller is inserted in the socket; and a key carried by said second spindle, a second lock projecting into the socket adapted to be engaged by the said key when the controller is inserted in the socket; and gearing between the key projecting into the socket and the second lock.

79. In a machine of the character specified, a printer, a controller socket in the machine, a lock in said socket, a key in the socket beside said lock, gearing between the lock and the key, a rotatable member in said socket adjacent the lock and key; and gearing whereby said member is driven in unison with the printer; with a controller adapted to be inserted in said socket or removed therefrom; means carried by the controller adapted to engage said key; a key carried by said controller adapted to engage the said lock when the controller is inserted in the socket; setting devices in said controller, and means adapted to engage the said rotatable member so that the disk setting devices are operated thereby when the controller is inserted in the socket.

80. In combination with mechanism as set forth in claim 79, means for locking said devices; and means whereby when the said devices are locked the printer and the register are rendered inoperative.

81. In combination with mechanism as set forth in claim 79, means whereby when the controller is removed from the machine the printer and the register are rendered inoperative.

82. In combination with mechanism as set forth in claim 79, means for locking said devices; means whereby when the said devices are locked the printer and the register are rendered inoperative; and means whereby when the controller is removed from the machine the printer and register are rendered inoperative.

83. In a machine of the character specified, a printer, a register, means for locking said printer and said register, a lock controlling said means, a key adjacent said lock and gearing between the lock shaft and the key shaft a rotatable member and gearing whereby said member is driven in unison with the register and printer; with a controller adapted to be inserted in or removed from the machine; a key carried by said controller adapted to engage the said lock when the controller is inserted in the machine; a series of inter-related disks in said controller adapted to be operated by the said rotatable member when the controller is inserted in the machine, and a lock controlling said disks adapted to be engaged by the key in the socket when the controller is inserted in the machine.

84. In combination with mechanism as set forth in claim 83, means for locking the disks; and means whereby when the disks are locked the printer and the register are rendered inoperative.

85. In combination with mechanism as set forth in claim 83, means whereby when the controller is removed from the machine the printer and the register are rendered inoperative.

86. In combination with mechanism as set forth in claim 83, means for locking the disks; means whereby when the disks are locked the printer and the register are rendered inoperative; and means whereby when the controller is removed from the machine the printer and the register are rendered inoperative.

87. In combination with mechanism as set forth in claim 83, means whereby when the disks in the controller are locked the printer and register will be rendered inoperative until the controller is removed, reset and replaced in the machine.

88. In combination with mechanism as set forth in claim 83, means whereby when the controller is removed from the machine the printer and the register are locked, and means controlled by said locking means whereby when the disks in the controller are locked the said printer and said register will be rendered inoperative until the controller is removed, reset and replaced in the machine.

89. In a machine of the character specified, having a printer, a meter containing a register adjacent the printing mechanism and having a controlled socket, gearing between the printer and meter whereby the register is operated for each operation of the printing mechanism; devices for locking said printer and register; a lock in the socket; a key projecting into the said socket beside said lock, gearing between the lock shaft and the key shaft; a rotatable member in said socket, and gearing whereby said member is driven in unison with the register and printer; with a controller adapted to be inserted in said socket or removed therefrom; a key carried by said controller adapted to engage the said lock when the controller is inserted in the socket, a series of inter-related disks in said controller, means in the controller adapted to engage the said rotatable member so that the disks are operated thereby when the controller is inserted in the socket; means for locking the disks when the controller is removed from the machine; and a second lock controlling said locking means and adapted to be engaged by the key in the socket when the controller is inserted in the socket.

90. In mechanism as set forth in claim 89, means whereby when the controller is removed from the socket the printer and the register are rendered inoperative.

91. In mechanism as set forth in claim 89 means whereby when the controller is removed from the socket the printer and the register are locked, and means controlled by said locking means whereby when the disks in the controller are locked the said printer and said register will be rendered inoperative until the controller is removed from the socket, reset and replaced in the socket.

In testimony that I claim the foregoing as my own I affix my signature.

ARTHUR H. PITNEY.